(12) United States Patent
Imaoka et al.

(10) Patent No.: US 10,723,195 B2
(45) Date of Patent: Jul. 28, 2020

(54) MOVING BODY

(71) Applicant: Panasonic Intellectual Property Management Co., Ltd., Osaka (JP)

(72) Inventors: Noriaki Imaoka, Osaka (JP); Takeshi Ando, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 93 days.

(21) Appl. No.: 16/116,584

(22) Filed: Aug. 29, 2018

(65) Prior Publication Data
US 2019/0077212 A1 Mar. 14, 2019

(30) Foreign Application Priority Data
Sep. 8, 2017 (JP) .................. 2017-173462

(51) Int. Cl.
| | | |
|---|---|---|
| B60G 21/04 | (2006.01) | |
| B62D 39/00 | (2006.01) | |
| B60G 17/019 | (2006.01) | |
| B60G 17/0165 | (2006.01) | |
| B60G 7/00 | (2006.01) | |
| B62D 61/10 | (2006.01) | |
| B62D 61/12 | (2006.01) | |

(52) U.S. Cl.
CPC ............ *B60G 21/04* (2013.01); *B60G 7/001* (2013.01); *B60G 17/0165* (2013.01); *B60G 17/01908* (2013.01); *B62D 39/00* (2013.01); *B62D 61/10* (2013.01); *B62D 61/12* (2013.01); *B60G 2204/422* (2013.01); *B60G 2206/122* (2013.01)

(58) Field of Classification Search
CPC ........ B60G 21/03; B60G 21/04; B60G 7/001; B60G 17/0165; B60G 17/01908; B60G 2204/422; B60G 2800/019; B60G 2500/30; B60G 2400/823
See application file for complete search history.

(56) References Cited

U.S. PATENT DOCUMENTS

| | | | | |
|---|---|---|---|---|
| 3,917,306 A | * | 11/1975 | Madler ................ | B60G 11/08 280/104 |
| 5,004,257 A | * | 4/1991 | MacIsaac ............ | B60G 21/00 180/299 |
| 7,377,522 B2 | | 5/2008 | MacIsaac | |

(Continued)

FOREIGN PATENT DOCUMENTS

| | | |
|---|---|---|
| JP | 63-090413 | 4/1988 |
| JP | 10-181330 | 7/1998 |

(Continued)

*Primary Examiner* — Karen Beck
(74) *Attorney, Agent, or Firm* — Wenderoth, Lind & Ponack, L.L.P.

(57) ABSTRACT

A moving body includes a frame, a pair of right and left first wheels, a pair of right and left second wheels, a pair of right and left first parallel links connecting the first wheels and the second wheels, and a second parallel link connecting the pair of right and left first parallel links. Furthermore, a height changing unit connects the second parallel link and the frame and changes a position of the frame in a height direction with respect to the second parallel link, and a controller controls the height changing unit so as to maintain a height of the frame from a road surface.

9 Claims, 4 Drawing Sheets

(56) References Cited

U.S. PATENT DOCUMENTS

| | | | | |
|---|---|---|---|---|
| 7,721,593 B2* | 5/2010 | Pfadenhauer | ......... | G01M 9/062 |
| | | | | 73/117.03 |
| 2017/0137023 A1* | 5/2017 | Anderson | ............. | B60W 10/22 |
| 2017/0203628 A1 | 7/2017 | Dames et al. | | |
| 2019/0009629 A1* | 1/2019 | Beylin | ................... | B60G 21/04 |

FOREIGN PATENT DOCUMENTS

| | | |
|---|---|---|
| JP | 2004-306850 | 11/2004 |
| JP | 4310462 B2 * | 8/2009 |
| JP | 5015528 B | 12/2012 |

\* cited by examiner

MOVING BODY

TECHNICAL FIELD

The technical field relates to a moving body including wheels.

BACKGROUND

There has been hitherto known a moving body capable of conveying a load stably by keeping a loading table in a horizontal position even at the time of running on a rough terrain where there is roughness on a running road surface (for example, refer to Japanese Patent No. 5105528 (hereinafter JP '528).

The moving body disclosed in JP '528 has four wheels as shown in FIG. 4. A pair of right and left front wheels and a pair of right and left rear wheels are connected by wheel support arms 210 which are long bodies. The wheel support arm 210 supporting front wheels and the wheel support arm 210 supporting rear wheels are arranged on a front-end side and a rear-end side of a casing 211. Moreover, a loading table 212 is attached to the casing 211 through table support arms 213.

The wheel support arms 210 connecting the pair of right and left wheels are attached to the casing 211 so as to turn around a roll axis (an axis parallel to a traveling direction of the moving body).

The table support arms 213 supporting the loading table 212 are attached to the casing 211 so as to turn around a pitch axis (an axis in a right and left direction orthogonal to the roll axis).

The moving body having the above structure can move while keeping the loading table 212 in the horizontal position at the time of passing the rough terrain such as bumps by controlling angles of the wheel support arms 210 around the roll axis and angles of the table support arms 213 around the pitch axis.

In the moving body disclosed in JP '528, to maintain a position of the loading table 212 at the time of running on the rough terrain such as bumps is considered. However, variation in positions of the loading table 212 in upper and lower directions is not considered. Therefore, when the moving body runs in a state where liquid or the like is housed in the loading table 212, there is a problem that liquid spills due to variation of the loading table 212 in upper and lower directions.

It is necessary to give a large drive force to wheels momentarily when the moving body climbs over a bump. In such case, wheels start to ascend powerfully. In the loading table 212 disclosed in JP '528, the position in the upper and lower directions is fixed with respect to the casing 211, therefore, the loading table 212 also ascends powerfully. Therefore, when an object to be conveyed is placed on the loading table 212, positional displacement of the load to be conveyed with respect to the loading table 212 tends to be occur, and there is concern that it is difficult to stably convey the load to be conveyed.

SUMMARY OF THE INVENTION

An object of the present invention is to provide a moving body capable of stably running even when running on the rough terrain where there is roughness, and further capable of stably conveying loads to be conveyed by suppressing variation in positions in a height direction of loads to be conveyed.

In order to achieve the above object, a moving body according to the present disclosure includes a frame, a pair of right and left first wheels supporting the frame, a pair of right and left second wheels provided on a rear side of the first wheels in a traveling direction, a pair of right and left first parallel links connecting the first wheels and the second wheels, a second parallel link connecting the pair of right and left first parallel links, a height changing unit connecting the second parallel link and the frame and changing a position of the frame in a height direction with respect to the second parallel link and a state detection unit detecting a state of the frame.

When adopting the moving body according to the present disclosure, stable running is realized even in a case of running on a rough terrain with roughness and it is further possible to convey the load to be conveyed stably by suppressing variation in position of the load to be conveyed in a height direction.

DESCRIPTION OF EMBODIMENTS

Figure 1:
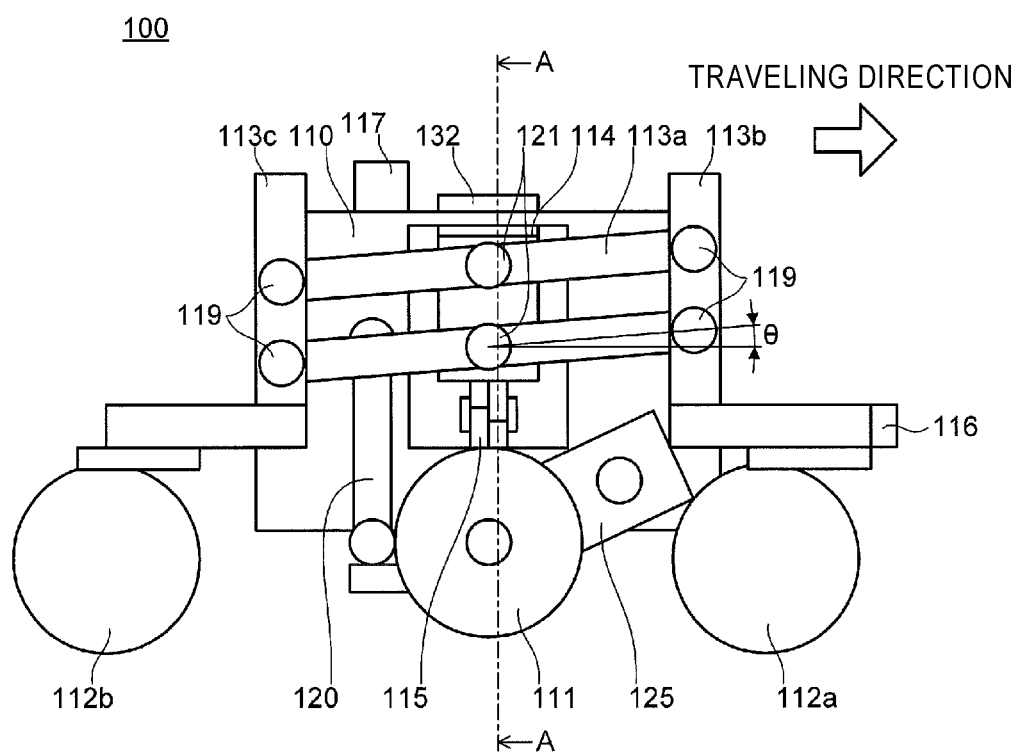
FIG. 1 is a side view showing an outline of a moving body according to an embodiment of the present disclosure.

Hereinafter, an embodiment of the present disclosure will be explained with reference to the drawings. The same reference numerals are given to the same or corresponding components. In the drawings, respective components are schematically shown for making the drawings easy to understand.

Figure 2:
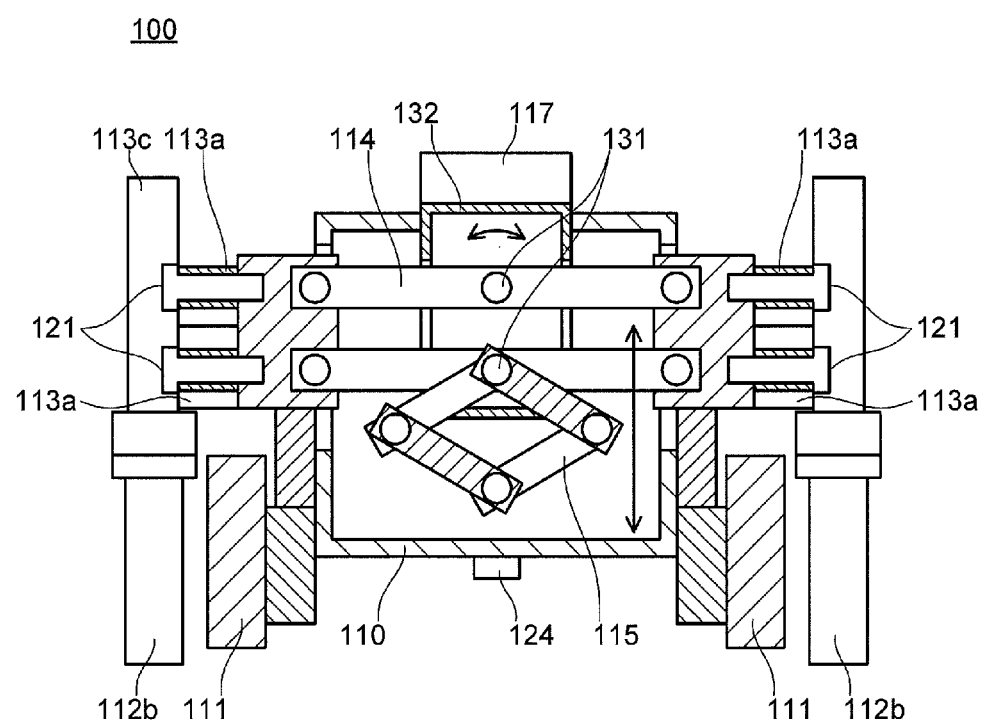
FIG. 2 is a cross-sectional view taken along A-A line of FIG. 1.

FIG. 1 is a side view showing an outline of a moving body 100 according to the embodiment of the present disclosure. FIG. 2 is a view showing a cross section taken along A-A line of FIG. 1.

As shown in FIG. 1 and FIG. 2, the moving body 100 according to the embodiment of the present disclosure includes a frame 110, a pair of right and left drive wheels 111 supporting the frame 110, a pair of right and left front auxiliary wheels 112a provided in a front part of the frame 110, a pair of right and left rear auxiliary wheels 112b provided in a rear part of the fame 110, a pair of right and left first parallel links 113 connecting the front auxiliary wheels 112a and the rear auxiliary wheels 112b (corresponding to 113a, 113b and 113c in FIG. 1), a second parallel link 114 connecting the pair of right and left first parallel links 113, a second parallel link holding member 132 holding the second parallel link 114, a height changing unit 115 connecting the second parallel link holding member 132 and the frame 110 and changing the height of the second parallel holding member 132 with respect to the frame 110, a state detection unit 124 detecting a state of the frame 110 and a controller 117.

The frame 110 is a box-shaped casing on which the controller 117 is arranged at an upper part. The frame 110 has a placing part in which or on which a load to be conveyed is placed.

The pair of right and left drive wheels 111 are members that support the frame 110 and move the frame 110 by being driven to rotate. The drive wheels 111 rotate when power of a drive unit (not shown) housed in the frame 110 is transmitted.

The pair of right and left drive wheels 111 are held by a drive wheel holding member 125 connected to the frame 110 so as to rotate freely. The drive wheel holding member 125 is a member one end of which is held on a side surface of the frame 110 so as to turn freely and the other end of which is connected to an elastic member 120.

The elastic member 120 is connected to a side surface of the frame 110 at one end thereof and connected to the drive wheel holding member 125 at the other end thereof. The elastic body 120 is, for example, a gas spring.

A force acts on the elastic member 120 in a compression direction due to own weight of the moving body 100. In other words, the elastic member 120 is a member allowing the force to act in a direction of lifting up the frame 110 to support the frame 110.

The pair of right and left front auxiliary wheels 112a are auxiliary wheels provided in the front part of the frame 110 as described above. The front auxiliary wheels 112a are so-called flexible casters, which are provided so as to rotate freely around a vertical axis with respect to the first parallel links 113.

The pair of right and left rear auxiliary wheels 112b are auxiliary wheels provided in the rear part of the frame 110 as described above. The rear auxiliary wheels 112b are so-called flexible casters, which are provided so as to rotate freely around the vertical axis with respect to the first parallel links 113.

As the front auxiliary wheels 112a and the rear auxiliary wheels 112b are provided around the vertical axis so as to rotate freely, when the pair of right and left drive wheels 111 are rotated in directions opposite to each other, the moving body 100 performs pivot turn.

The first parallel links 113 are members connecting the front auxiliary wheels 112a and the rear auxiliary wheels 112b. The first parallel links 113 include pairs of upper and lower parallel links 113a, L-shaped front auxiliary wheel support members 113b supported by the front auxiliary wheels 112a and L-shaped rear auxiliary wheel support members 113c supported by the rear auxiliary wheels 112b.

Through holes are provided in front ends of the parallel links 113a and the front auxiliary wheel support member 113b, and connecting fittings 119 are inserted into these through holes to thereby connect the parallel links 113a and the front auxiliary wheel support members 113b.

Also, through holes are provided in rear ends of the parallel links 113a and the rear auxiliary wheel support members 113c, and connecting fittings 119 are inserted into these through holes to thereby connect the parallel links 113a and the rear auxiliary wheel support members 113c. Moreover, approximately central parts of the pair of upper and lower parallel links 113a are connected to the second parallel link 114 by support shafts 121.

The first parallel links 113 are arranged so as to ascend toward the front side in a traveling direction of the moving body 100 with respect to a horizontal surface. Accordingly, the front auxiliary wheels 112a are displaced upward smoothly when contacting a bump and start to ascend as compared with a case where the first parallel links 113 are horizontally arranged.

An angle $\theta$ made by the first parallel link 113 and the horizontal surface is preferably 5 degrees or more and 20 degrees or less. When $\theta$ is set to a value lower than 5 degrees, the front auxiliary wheels 112a do not ascend smoothly and it is necessary to generate a large drive force in the drive unit even when climbing over a bump of about 10 mm. Accordingly, the drive unit (an electric motor or the like) has to be increased in size.

On the other hand, when $\theta$ is set to a value higher than 20 degrees, a distance between the front auxiliary wheel 112a and the rear auxiliary wheel 112b is shortened as compared with the case where $\theta$ is set to a lower value, which deteriorates the stability of the moving body 100.

It is also preferable that a link length of the first parallel links 113 in the traveling direction is set to be shorter than the distance between the front auxiliary wheel 112a and the rear auxiliary wheel 112b, namely, the distance between the front auxiliary wheel 112a and the rear auxiliary wheel 112b is preferably set to be longer than the link length of the first parallel links 113 in the traveling direction. In this case, the distance between the auxiliary wheels 112a and 112b becomes longer as compared with a case where the link length of the first parallel links 113 and the distance between the front auxiliary wheel 112a and the rear auxiliary wheel 112b are set to the same distance, as a result, the moving body 100 can climb over a convex portion such as a bump more stably.

The second parallel link 114 is a member for connecting the pair of right and left first parallel links 113. The second parallel link 114 configures a parallel link mechanism. The second parallel link 114 is pivotally supported by the second parallel link holding member 132 using support shafts 131 at approximately the central part thereof.

The height changing unit 115 is a member connecting the frame 110 and the second parallel link holding member 132 and changing the position in a height direction of the second parallel link holding member 132 with respect to the frame 110. The height changing unit 115 is formed by a linear motion mechanism such as a rack and pinion or a link mechanism such as a pantograph.

As shown in FIG. 2, when the height changing unit 115 is formed by the pantograph, a joint portion on a lower side of the pantograph is connected to the frame 110 and a joint portion on an upper side is connected to the second parallel link holding member 132 with the second parallel link 114 by the support shaft 131.

The frame 110 is also provided with a height drive unit (not shown) for rotating the link using the lower side joint portion as a fulcrum. The height drive unit is, for example, an electric motor such as a servo motor.

When the height drive unit is rotated in either of normal and reverse directions, the link forming the pantograph is deformed to stretch in a vertical direction. At this time, the second parallel link holding member 132 is pushed upward with respect to the frame 110. That is, a relative position of the frame 110 with respect to the second parallel link holding member 132 is displaced downward.

On the other hand, when the height drive unit is rotated in the other direction, the link is deformed to stretch in the horizontal direction. At this time, the second parallel link holding member 132 is pushed downward with respect to the frame 110. That is, the relative position of the frame 110 with respect to the second parallel link holding member 132 is displaced upward.

The controller 117 is a control device such as a processor that controls respective components of the moving body 100. The controller 117 is arranged in an upper part of the frame 110 as described above. However, the arrangement of the controller 117 is not limited to this, and the controller 117 may be housed inside the frame 110. Functions of the controller 117 will be explained below with reference to FIG. 3.

Figure 3:
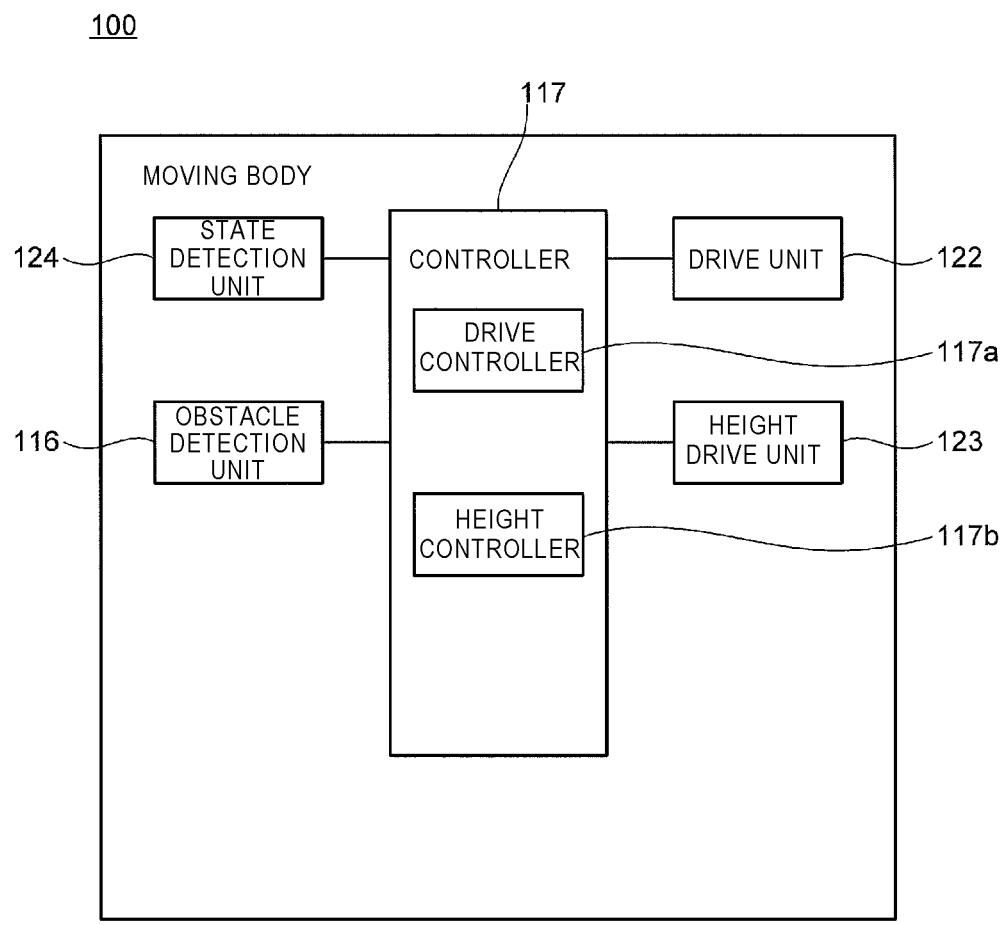
FIG. 3 is a block diagram showing functions of respective units relating to input/output of a controller.
Figure 4:
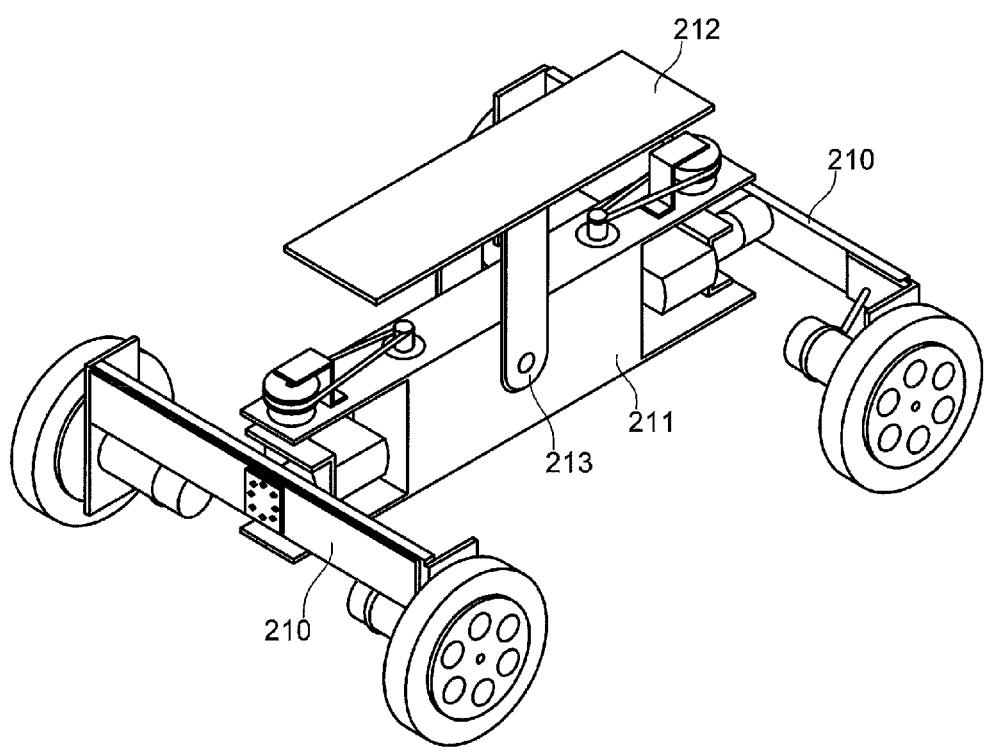
FIG. 4 is a view for explaining a moving body described in Patent Literature 1.

Next, functions of respective units relating to input/output in the controller 117 will be explained. FIG. 3 is a block diagram showing functions of respective units relating to input/output of the controller 117. The controller 117 receives output signals outputted from the state detection unit 124 and an obstacle detection unit 116. The controller 117 drives to control a drive unit 122 and a height drive unit 123 based on the output signals outputted by the state detection unit 124 and the obstacle detection unit 116.

The state detection unit 124 is a detection unit that detects a state of the moving body 100 for keeping a height from the road surface to the frame 110 constant. The state detection unit 124 is, for example, a photosensor that measures the height from the road surface to the frame 110. The state detection unit 124 may also be, for example, an acceleration sensor that detects an acceleration in the height direction of the frame 110. The state detection unit 124 outputs a detection signal indicating a detected value to the controller 117.

The obstacle detection unit 116 is a detection unit that detects objects existing around the moving body 100. The obstacle detection unit 116 is, for example, an infrared laser sensor. The obstacle detection unit 116 detects a direction where the object exists and a distance from the obstacle detection unit 116 to the object and outputs a detection signal indicating detected information to the controller 117.

The controller 117 is a control device that controls running of the moving body 100. The controller 117 includes a drive controller 117a and a height controller 117b.

The drive controller 117a is a control device that outputs a control signal to the drive unit 122 to control the drive unit 122. The drive controller 117a generates a control signal based on operation input information inputted from an operation unit. The drive controller 117a may generate the control signal, for example, based on a computer program stored in a storage unit.

The drive controller 117a determines a position of an obstacle based on the detection signal outputted from the obstacle detection unit 116 and controls the drive unit 122 to allow the moving body 100 to run while avoiding the detected obstacle.

The height controller 117b is a control device that controls the height drive unit 123. The height controller 117b outputs a control signal to the height drive unit 123 to control the height drive unit 123.

The drive unit 122 is a drive device for driving the drive wheels 111. The drive unit 122 is, for example, an electric motor such as a servo motor or a stepping motor. The drive unit 122 is driven based on the control signal outputted from the drive controller 117a.

The height drive unit 123 is a drive device that drives the height changing unit 115. The height drive unit 123 is, for example, an electric motor such as a servo motor or a stepping motor. The height drive unit 123 is driven based on the control signal outputted from the height controller 117b.

Next, the behavior of respective components of the moving body 100 at the time when the moving body 100 passes a convex portion on a running route will be explained.

When either or both of the pair of right and left front auxiliary wheels 112a abut on the convex portion, the front auxiliary wheels 112a start to ascend so as to climb over the convex portion. At this time, the first parallel links 113 turn so that the front parts ascend with the support shafts 121 as fulcrums by receiving the force from the front auxiliary wheels 112a.

As described above, the first parallel links 113 are arranged so as to ascend toward the front side with respect to the horizontal surface, therefore, the front auxiliary wheels 112a can ascend smoothly to reach the upper part of the convex portion.

Though the moving body 100 receives the force around the pitch axis at this time, the first parallel links 113 turn around the support shafts 121 as the fulcrums, therefore, the frame 110 can maintain the horizontal posture.

In a case where only one of the front auxiliary wheels 112a in the pair of right and left front auxiliary wheels 112a climbs over the convex portion, the moving body 100 further receives a force around the roll axis. At this time, the second parallel link 114 to which the first parallel links 113 are connected turns around the support shafts 131 as fulcrums, therefore, the frame 110 can maintain the horizontal posture.

The height controller 117b drives the height drive unit 123 when the moving body 100 passes the convex portion to perform control to keep the height from the road surface to the frame 110 constant.

For example, in the case where the state detection unit 124 is the photosensor for detecting the height from the road surface to the frame 110, when the front auxiliary wheels 112a start to ascend along the convex portion, the state detection unit 124 detects that the height from the road surface to the frame 110 has increased.

When the increase in height from the road surface to the frame 110 is detected, the height controller 117b drives the height drive unit 123. The height drive unit 123 rotates in a given direction and actuates the height changing unit 115 to displace the relative position of the frame 110 with respect to the second parallel link holding member 132 downward.

Accordingly, the height controller 117b can displace the position of the frame 110 with respect to the second parallel link holding member 132 so as to correspond to the ascending of the front auxiliary wheels 112a to thereby keep the height from the road surface to the frame 110 constant.

According to the above, it is possible to prevent a sudden change in height of the frame 100 due to the front auxiliary wheel 112a running on the convex portion.

Moreover, in the case where the state detection unit 124 is the acceleration sensor, when the front auxiliary wheels 112a start to ascend along the convex portion, an acceleration of the frame 110 in the height direction is detected. When the acceleration of the frame 110 is detected by the state detection unit 124, the height controller 117b drives the height drive unit 123 so that the acceleration of the frame 110 becomes "0 (zero)" to displace the relative position of the frame 110 with respect to the second parallel link 114 downward.

According to the above, the height controller 117b can displace the position of the frame 110 with respect to the second parallel link holding member 132 so as to correspond to the ascending of the front auxiliary wheels 112a to thereby keep the height from the road surface to the frame 110 constant.

When the front auxiliary wheels 112a start to descend from the convex portion on which the wheels run, the state detection unit 124 detects that the height from the road surface to the frame 110 is reduced. When the reduction in height from the road surface to the frame 110 is detected, the height controller 117b drives the height drive unit 123. The height drive unit 123 rotates in a direction reverse to the given direction and actuates the height changing unit 115 to displace the relative position of the frame 110 with respect to the second parallel link holding member 132 upward.

Accordingly, the height controller 117b can displace the position of the frame 110 with respect to the second parallel link holding member 132 so as to correspond to the descending of the front auxiliary wheels 112a to thereby keep the height from the road surface to the frame 110 constant.

In the above embodiment, the example in which the first parallel links 113 are turned around the support shafts 121 passively and the second parallel link is turned around the support shafts 131 passively when the front auxiliary wheels 112a climb over the convex portion has been described, however, the present disclosure is not limited to this.

For example, it is also preferable that a motor for swinging either or both of the first parallel links 113 and the second parallel link 114 is provided to thereby allow either or both of the first parallel links 113 and the second parallel link 114 to turn actively so as to correspond to the shape of the bump.

In this case, a height of an obstacle existing in the traveling direction of the moving body 100 is detected by the above-described obstacle detection unit 116. Either or both of angles of the first parallel links 113 and the second parallel link 114 are controlled so that the front auxiliary wheels 112a ascend corresponding to the height of the obstacle detected by the obstacle detection unit 116.

Furthermore, in a case where obstacles having different heights exist on running routes of the left-side front auxiliary wheel 112a and the right-side front auxiliary wheel 112a, the second parallel link 114 is turned in accordance with a difference in heights of respective obstacles. In this case, the difference in heights of respective obstacles is detected by the obstacle detection unit 116.

As described above, either or both of the first parallel links 113 and the second parallel link 114 are turned actively so as to correspond to the obstacle, thereby allowing the moving body 100 to climb over the bump such as the convex portion more smoothly.

In the above embodiment, the example in which the height changing unit 115 is connected to the second parallel link holding member 132 with the second parallel link 114. However, the present disclosure is not limited to this example. For example, when the height changing unit 115 is formed by the rack and pinion, the height changing unit 115 may be connected to the second parallel link holding member 132 and the second parallel link holding member 132 may be connected to the second parallel link 114.

Furthermore, the structure in which the drive wheels 111 are provided in the approximately central part of the frame 110 in a front and rear direction and the auxiliary wheels are provided in front and rear of the drive wheels 111 in the above embodiment, however, the present disclosure is not limited to the structure.

For example, it is also preferable that the rear auxiliary wheels 112b may be driven without providing the driving wheels 111 in the above embodiment. In this case, the rear auxiliary wheels 112b are attached to the rear auxiliary wheel support members 113c in a state where the orientation is fixed in the front and rear direction.

When the moving body 100 is towed by another moving body 100, it is not always necessary to provide the drive unit 122.

According to the above, the same effects as the above embodiment can be obtained with a simpler structure.

The present disclosure can be widely used in fields of autonomous mobile robots and autonomous driving.

What is claimed is:
1. A moving body comprising:
a frame;
a pair of right and left first wheels supporting the frame;
a pair of right and left second wheels provided on a rear side of the first wheels in a traveling direction;
a pair of right and left first parallel links connecting the first wheels and the second wheels;
a second parallel link connecting the pair of right and left first parallel links;
a height changing unit connecting the second parallel link and the frame and configured to change a position of the frame in a height direction with respect to the second parallel link; and
a state detection unit configured to detect a state of the frame,
wherein the first parallel links are arranged so as to ascend toward the front side with respect to the traveling direction.

2. The moving body according to claim 1, further comprising;
a controller configured to control the height changing unit so as to maintain a height of the frame from a road surface based on the state detected by the state detection unit.

3. The moving body according to claim 1,
wherein an angle between the first parallel link and a horizontal surface is 5 degrees or more and 20 degrees or less.

4. The moving body according to claim 1, further comprising:
an obstacle detection unit configured to detect a height of an obstacle existing in the traveling direction,
wherein the first parallel links turn in accordance with a height of the obstacle detected by the obstacle detection unit.

5. The moving body according to claim 4,
wherein the obstacle detection unit is configured to detect heights of obstacles existing in front of the respective right and left first wheels in the traveling direction, and
the second parallel link is configured to turn in accordance with a difference in heights of the obstacles detected by the obstacle detection unit.

6. The moving body according to claim 1,
wherein a link length of the first parallel links in the traveling direction is shorter than a distance between the first wheels and the second wheels.

7. The moving body according to claim 1,
wherein the state detection unit is a sensor configured to detect the height of the frame from the road surface.

8. The moving body according to claim 1,
wherein the state detection unit is a sensor configured to detect an acceleration of the frame.

9. A moving body comprising:
a frame;
a pair of right and left first wheels supporting the frame;
a pair of right and left second wheels provided on a rear side of the first wheels in a traveling direction;
a pair of right and left first parallel links connecting the first wheels and the second wheels;
a second parallel link connecting the pair of right and left first parallel links;
a height changing unit connecting the second parallel link and the frame and configured to change a position of the frame in a height direction with respect to the second parallel link;
a state detection unit configured to detect a state of the frame,
an obstacle detection unit configured to detect a height of an obstacle existing in the traveling direction,
wherein the first parallel links turn in accordance with a height of the obstacle detected by the obstacle detection unit, wherein the obstacle detection unit is configured to detect heights of obstacles existing in front of the respective right and left first wheels in the traveling direction, and
wherein the second parallel link is configured to turn in accordance with a difference in heights of the obstacles detected by the obstacle detection unit.

* * * * *